United States Patent [19]

Wolfe et al.

[11] Patent Number: 4,907,680

[45] Date of Patent: Mar. 13, 1990

[54] SEMI-ACTIVE DAMPER PISTON VALVE ASSEMBLY

[75] Inventors: Paul T. Wolfe, Apex; Charles M. Nobles, Fuquay-Varina; Lane R. Miller, Cary, all of N.C.

[73] Assignee: Lord Corporation, Erie, Pa.

[21] Appl. No.: 150,112

[22] Filed: Jan. 29, 1988

[51] Int. Cl.[4] ............................................. F16F 9/46
[52] U.S. Cl. ................................... 188/299; 188/319; 188/322.15; 251/65; 251/129.01; 280/714
[58] Field of Search ................... 188/299, 319, 322.13, 188/322.14, 322.15; 280/707, 714; 251/129.01, 65

[56] References Cited

U.S. PATENT DOCUMENTS

| | | | |
|---|---|---|---|
| 3,807,678 | 4/1974 | Karnopp et al. | 248/358 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 |
| 4,501,298 | 2/1985 | Inada et al. | 251/65 X |
| 4,527,676 | 7/1985 | Emura et al. | 188/299 |
| 4,600,215 | 7/1986 | Kuroki et al. | 280/707 |
| 4,620,619 | 11/1986 | Emura et al. | 188/319 |
| 4,638,896 | 1/1987 | Poyser | 188/299 |
| 4,660,686 | 4/1987 | Münning et al. | 188/280 |
| 4,673,067 | 6/1987 | Münning et al. | 188/299 |
| 4,673,194 | 6/1987 | Sugasawa | 280/707 |
| 4,681,143 | 7/1987 | Sato et al. | 137/625.37 |
| 4,683,992 | 8/1987 | Watanabe | 188/299 |
| 4,686,626 | 8/1987 | Kuroki et al. | 364/427 |
| 4,696,379 | 9/1987 | Yamamoto et al. | 188/299 |
| 4,696,489 | 9/1987 | Fujishiro et al. | 280/707 |

FOREIGN PATENT DOCUMENTS 221602 5/1987 European Pat. Off. ............ 188/319

Primary Examiner—George E. A. Halvosa

Attorney, Agent, or Firm—David L. McCombs

[57] ABSTRACT

An improved isolation system for time responsive attenuation control led electromechanical valve assembly comprising the piston of motion between spaced members is provided having a remotely actuator of a fluid damper for generating motion attenuating forces. The piston valve assembly employs a moving coil valve slider moveable between first and second positions to generate damper forces independently of the fluid pressure differential between opposing fluid chambers. Direct flow passages extend through the piston valve assembly between the opposing chambers. In the first position of the valve slider, fluid flow is substantially permitted through the direct flow passages to provide a substantially nonresistant damper force. In the second position, the valve slider intersects internal porting portions of the direct flow passages to substantially restrict fluid flow therethrough and provide a resistant damper force. The valving element of the slider and the internal porting portions of the direct flow passages are relatively configured so that fluid flow through the direct flow passages meets the valve element at right angles to the direction of the slider motion. In the second position, fluid flow is restricted along either the inner or outer diameter surfaces of the valve element perpendicular to the axis of motion of the slider to prevent biasing even under extreme fluid pressure conditions. The direct flow passages are radially spaced to provide radially equalized pressure forces on the slider to prevent jamming. In an alternative embodiment, the piston valve assembly includes a unidirectional flow arrangement across the valve element during both extension and retraction of the fluid damper. The arrangement of flow passages and check valves requires fluid flow across the slider radially outwardly at all times.

5 Claims, 4 Drawing Sheets

SEMI-ACTIVE DAMPER PISTON VALVE ASSEMBLY

BACKGROUND OF THE INVENTION

The present invention relates generally to semi-active damping assemblies and more particularly provides a uniquely configured semi-active damper incorporating a remotely controlled electromechanical valve within a piston. Specifically, the valve is of the voice coil type for real time response to command signals for continuous control of resistant force generated by the damper.

As exemplified in U.S. Pat. Nos. 3,807,678; 4,660,686; 4,468,050; and 4,468,739, a variety of hydraulic dampers of the semi-active type have been proposed for attenuating motion between relatively movable members, such as in vehicular suspension systems and for other applications. Development of semi-active devices has been a natural result of the inherent limitations found in passive systems and the expense and power requirements associated with purely active systems.

As referred to herein, a passive motion attenuation system, such as a standard spring and shock absorber combination, exhibits performance which is solely a function of its inherent structural characteristics. The damping parameters chosen represent a design compromise over the full range of shock and vibration motion experienced by the system. Active systems, on the other hand, employ a damper force which can be made proportional to the absolute velocity or other quantity of the mass to be isolated resulting in an externally generated force in the damper which is independent of the relative movement of the damper. This may be accomplished through the use of a hydraulically pumped force-generating actuator. The result is controlled damping force at the expense of large auxiliary power requirements. Especially heavy vehicles are ill suited to provide appropriate power to drive such active systems, while the elaborate and costly components required for implementation even in standard vehicles also makes them a poor design choice. Further, the inertial characteristics of the hydraulic pumping means, fluid and servo valves within the active system are not satisfactorily responsive at high frequencies due to the inability of such equipment to rapidly respond to control signals.

Other devices which operate to provide somewhat improved damping characteristics include relatively low power, electromagnetically adjustable shock absorbers as disclosed in U.S. Pat. Nos. 4,638,896; 4,660,686 and 4,673,067. So-called adjustable shock absorbers use electromagnetic valves to vary the damping force, but are incapable of generating a damper force proportional to the absolute velocity or other quantity of the mass to be isolated independent of the relative movement of the damper. The system, therefore, does not approximate the damper force of an active device since the adjustment of the damping force by the valve means is completely linearly dependent upon movement of the damper and pressure difference between the working fluid chambers. This method of adjusting or "fine tuning" a passive shock absorber, while an improvement over standard passive devices, cannot approach the performance of fully active or semi-active systems.

Adjustable type shock absorbers have nonetheless offered a practical method of providing improved damping performance without departing from the usual specifications for the use of such devices in assembly production vehicles, by incorporation of remotely controlled valve means within the piston of a standard configured shock absorber. Suitable valve design arrangements are known for these systems which do not demand the real-time performance of semi-active devices. For example, solenoid actuators connected remotely from the fluid cylinder or within the piston itself have been proposed for controlling a valve within the piston. Solenoid valve actuation, however, is subject to inherent time lag and power limitations caused by inductance. These and other undesirable characteristics include slow inertial response of necessary components and size constraints which make placement of the solenoid actuator within the piston itself awkward. The use of a moving coil actuator to solve many of the problems inherent to the solenoid has also been suggested. However, for application to adjustable shock absorber systems having valve means within the piston, the moving coil is typically biased by the fluid pressure within the cylinder, resulting in unreliable performance and jamming of the valve. The displacement of the valve is completely dependent upon the pressure difference between the opposing fluid chambers. Somewhat improved control and reliability have been gained by employment of intermediate fluid reaction chambers or hydraulic compensation devices; however, the overall designs proposed have heretofore been inadequate as means for damper control in fast-acting semi-active systems.

A semi-active system accomplishes motion attenuation by continuously controlling the damper force independently of the relative movement of the damper in "real time" response to a command signal. The semi-active damper differs from active systems in that it does not employ an active actuator means, hydraulic pump or similar external source of high-pressure fluid to provide the damping force. The resistance to fluid flow within the system generates the damper force. Thus, when the absolute velocity of the mass to be isolated is in a direction opposite to the relative motion between the mass and its support, the damper will not be able to provide a force in a direction to counteract the absolute velocity of the mass. While this is a limitation not found in a fully active system, the effect is minimized by having the damper provide a substantially zero or nonresistant force. If the absolute velocity is negative or in the opposite direction of relative velocity, a zero or nonresistant force is produced by non-restriction of fluid flow through the valve. If the absolute velocity is positive or in the same direction as the relative velocity between the mass and support, a damper force is generated by valve restriction of fluid flow. The bidirectional on-off control of damping force by fast-acting valve means, instantaneously responsive to command signals in this manner produces a system with desirable damping characteristics over the full range of vibratory motion.

While the semi-active damper concept provides a most effective and energy efficient method of enhanced vibration control, commercial development of component systems for application in automotive vehicle suspensions has been less than ideal. Semi-active fluid regulation mechanisms and attendant valving arrangements have heretofore not been readily adaptable to existing frame and suspension components of production line vehicles due to their volume and performance criteria. As exemplified in U.S. Pat. No. 4,491,207, adequately time responsive hydraulic valving arrangements for implementation of command signals in semi-active systems represent a significant departure from traditional valve-in-piston shock absorber technology. Design of a semi-active system characterized by placement of a sufficiently fast-acting valve within the piston of a standard shock absorber must adequately respond to control signals familiar to a semi-active system and be capable of providing appropriate damping characteristics during all modes of operation. Further, the valve arrangement must provide reliable as well as rapid performance over extended periods of operation.

It is accordingly an object of the present invention to provide a semi-active damper which eliminates or substantially minimizes the above mentioned and other problems and limitations typically associated with valve arrangements for semi-active devices of conventional construction and operation.

SUMMARY OF THE INVENTION

The present invention provides an improved isolation system for time responsive attenuation of motion between spaced members having an uniquely configured semi-active fluid damper connectable to signal control means. A remotely controlled electromechanical valve assembly comprises the piston actuator of the fluid damper for generating motion attenuating forces in accordance with performance requirements necessary for semi-active systems. The piston valve assembly employs a moving coil valve slider moveable between first and second positions to generate damper forces independently of the fluid pressure differential between opposing fluid chambers.

Since the moving coil valve slider does not experience problems of inductance or power losses normally associated with solenoid valve arrangements, a more reliable valve assembly is provided for real-time response to command signals. The moving coil is inherently simple and compact, and therefore well suited for incorporation within the piston. The slider additionally remains substantially unbiased by fluid pressure differential during its full range of reciprocative motion to provide for reliable performance and the generation of damper forces independently of the motion condition of the system.

In a preferred embodiment of the present invention, the piston valve assembly is compact and forms the fluid interface between opposing fluid chambers effectively replacing the piston head of a standard shock absorber. Upper and lower manifold portions interfit and serve to house the remaining elements of the piston valve assembly and create the interface between opposing fluid chambers. A plurality of direct flow passages extends through the upper and lower manifolds to permit fluid communication between the opposing chambers. Regulation of fluid flow through the direct flow passages in accordance with the selected signal control commands generates the damping forces. Internal porting within the direct flow passages forms an internal, perpendicular annular channel. Restriction of fluid flow in either direction through the direct flow passages occurs by controlled interaction of the valve slider with the internal porting. The moving coil slider is reciprocative between a first position in which fluid flow is permitted through the direct flow passages to provide a substantially nonresistant damper force, and a second position in which flow of fluid through the direct flow passages is substantially restricted along the internal porting portions to provide a resistant damper force. The bidirectional on-off control of damping force in response to semi-active signal commands produces attenuation of motion approximating that of a fully active damper.

The moving coil valve slider is reciprocative within the piston valve assembly about its longitudinal axis according to the direction of electrical current through the coil windings of the slider. The coil windings are oriented within a permanent magnetic field produced by a magnetic assembly. Electrical wiring extends through the piston rod of the damper assembly to connect to the moving coil windings for remote control thereof by the signal control means. In the second, fluid restricting position, relief valve means permit flow of fluid between opposing fluid chambers at a selected pressure differential.

The valve element of the moving coil valve slider and the internal porting portions of the direct flow passages are relatively configured and positioned so that fluid flow through the direct flow passages meets the valve element at right angles to the direction of slider motion. In this manner, the valve element in the second position intersects the internal porting portions to substantially restrict fluid flow therethrough without resulting in biasing of the slider even under extreme fluid pressure conditions. In order to further minimize fluid biasing, elevated valve guide means are provided to receive the valve element in the second position such that the fluid restricting surface is along either the inner or outer diameter surface of the valve element to prevent a pressure drop across the top of the valve element. The direct flow passages are also radially spaced to provide radially equalized pressure forces on the slider to prevent jamming.

Compared to variable damping systems of conventional construction, the present invention provides several distinct advantages. First, its relatively simple flow path arrangement and moving coil slider design render it easy and relatively inexpensive to manufacture. Additionally, the arrangement of the flow passages, magnetic components and moving coil provide for a relatively compact piston valve assembly which may be easily incorporated as the piston head within a standard configured shock absorber cylinder. Damper performance is consistently maintained even where the damper cylinder is of conventional length and circumference. The system may be easily applied within existing frame and vehicle suspension parameters and readily incorporated into production line assembly. Further, the piston valve assembly uniquely provides for reliable, real-time damping forces meeting semi-active performance criteria. The moving coil instantaneously responds to command signals even under adverse fluid pressure conditions. Fluid flow across the valve element portion of the slider occurs without fluid biasing or valve jamming caused by fluid pressure differentials normally associated with conventional valve arrangements. The damper provides for motion attenuation in response to semi-active command signals independently of the motion condition experienced by the system.

In an alternative embodiment of the piston valve assembly, unidirectional flow across the valve element is provided both during extension and retraction of the fluid damper. The arrangement of flow passages and check valves requires fluid flow across the slider radially outwardly at all times. This construction prevents deformation of the slider under extreme fluid pressure conditions and permits limited slider clearance without jamming.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Figure 1:
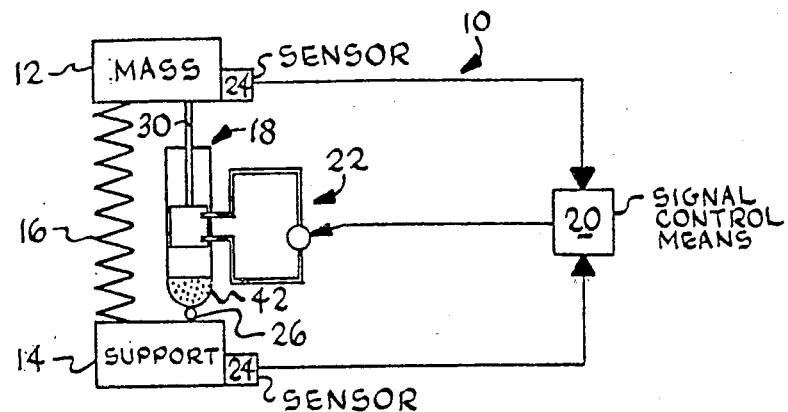
FIG. 1 is a schematic representation of an isolation system according to the present invention showing a controllable valve within the piston of a fluid damper.

Referring now to the Drawings, FIG. 1 illustrates a schematic representation of an isolation system 10 of the present invention. The isolation system 10 resiliently supports mass 12 relative to a support 14 utilizing in parallel a passive isolator 16 and a fluid damper 18. Fluid damper 18 is of the semi-active type and is externally controllable independently of the motion condition of the system by signal control means 20. In accordance with damper performance requirements typically associated with semi-active devices, a piston valve assembly 22 regulates fluid flow within damper 18 to adjust the damping characteristics of the system. In this manner, controllable counteracting forces are generated which reduce the transmissibility of the shock or vibratory condition being encountered between mass 12 and support 14; particularly in the amplification range of passive isolator 16. Piston valve assembly 22 is uniquely constructed to comprise the piston of a standard configured shock aborber for ready adaptablity to conventional automobile, truck, military and other vehicle suspension systems. The concepts herein also may well be employed in additional nonconventional vibration isolation applications.

As discussed, know variable dampers are limited in their performance, reliability and commercial production compatibility. In addition, less sophisticated, adjustable shock absorbing systems which incorporate an electromechanical valve within the piston are not designed for application to fast-acting valve arrangements such as those required for real-time response in semi-active systems.

Attempts to overcome these problems either by complex mechanical structures or by adaptation of existing valve technology to desirable fast-acting systems have not been entirely satisfactory.

The isolation system of the present invention overcomes the limitations of known prior art variable dampers. For instance, a fast-acting semi-active damper is provided having a piston valve assembly for real-time response to command signals conveniently incorporated within the piston head of a standard fluid shock absorber. It is reliable and may be manufactured readily. The valve arrangement does not experience problems of jamming or failure which plague existing devices. In addition, the valve arrangement is uniquely configured to eliminate fluid biasing which has previously been a source of failure and performance-related problems. While the piston valve assembly successfully responds to the performance requirements of semi-active devices, the advantages and features of the present invention need not be construed in a limiting sense. It is contemplated that the concepts herein may well be employed in a variety of variable damper devices with improved results. Further, in addition to the advantages associated with the incorporation of the invention to commercially available and tooled suspension system components, as will be apparent herein, the present invention may also be used for many other applications where it is desired to control the transmissibility of energy between spaced members.

Figure 2:
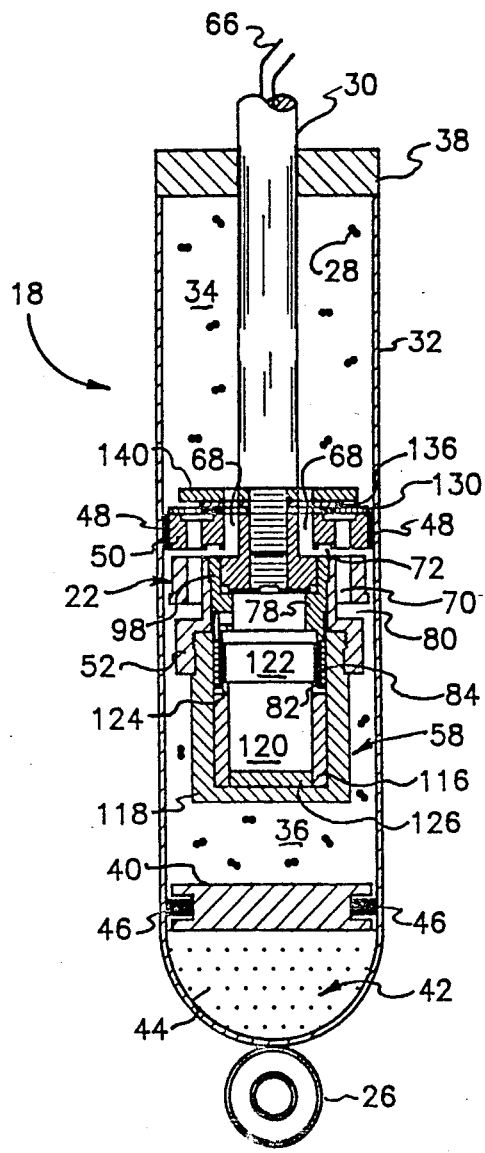
FIG. 2 is a partial cross-sectional view of a fluid damper illustrated in FIG. 1 incorporating a fast-acting valve of the present invention within the piston.

Referring once again to the drawings, and in particular FIGS. 1 and 2, isolation system 10 employs fluid damper 18 to regulate the transmissibility characteristics between mass 12 and support 14. Optimal reduction and control of shock and vibratory energy is accomplished in a semi-active manner wherein damper 18 generates controllable, counteracting forces without the input of significant additional energy such as in fully active systems, previously discussed. The force that can be generated by damper 18 by creation of a resistance to movement between mass 12 and support 14 is thus limited to being in a direction opposite to that of the relative motion between mass 12 and support 14. At times when the damper may be commanded to provide a force in a direction inconsistent with that available, the damper provides a substantially zero or nonresistant force under such a condition.

Sensors 24 mounted on both mass 12 and support 14 continuously monitor parameters indicative of a shock or vibratory condition such as positions, velocities and accelerations, and provide such information for processing to signal means 20. The number, location and type of sensors 24 may vary according to the requirements of the system and the motion condition which is experienced. Signal control means 20 operates to regulate fluid flow through piston valve assembly 22 to provide resistance to flow at times when counteracting forces are required, and provide nonresistance to fluid flow during times when a zero or nonresistant force is preferred. Piston valve assembly 22 operates very rapidly in real-time response to the particular control policy of signal means 20. In this manner, fluid damper 18 is externally controllable independent of the motion condition experienced by damper 18, for active regulation of its damping characteristics without significant external power requirements. In accordance with the particular type of signal means or control commands employed, effective regulation of the transmissibility characteristics of system 10 may be accomplished. It will be appreciated that as described herein system 10 has been somewhat simplified for purposes of clarity. The invention may in practice be applied to numerous types of systems which experience multiple degrees of freedom for controlling conditions of movement of any number and variety of members.

Damper assembly 18 is coupled in load transmitting relation between mass 12 and support 14, by, for example, a suitable connector 26 and a similar connector (not shown) attached to piston rod 30. Damper 18 in the embodiment shown is of a monotube design having a cylinder casing 32 filled a with suitable viscous or working fluid, conceptually represented in FIG. 2 by particles 28. Other shock absorber tube arrangements may also be contemplated. Valve assembly 22 also divides cylinder 32 into opposing fluid chambers 34 and 36. Fluid chambers 34 and 36 are variable in volume corresponding to movement of piston valve assembly 22 axially within cylinder 32. The working fluid is maintained within cylinder 32 even at very high pressures corresponding to load conditions experienced by members 38 and 40. In the embodiment shown, a piston accumulator 42 is located within cylinder 32 which allows for a necessary expansion of the volume of cylinder 32 caused by displacement of incompressible fluid during insertion of piston rod 30. A compressible medium, such as air, conceptually represented by particles 44, occupies the area defined within accumulator 42. Member 40 is forced axially by fluid to compress the air within accumulator 42, as required. Fluid is prevented from seeping into accumulator 42 by seal 46.

The piston valve assembly 22 is compact and forms the fluid interface between opposing chambers 34 and 36, effectively replacing the piston head of a standard shock absorber. Suitable sealing member 48 prevents seepage of fluid between chambers 34 and 36 along the radial surfaces of piston valve assembly 22. Incorporation of piston valve assembly 22 as a working piston head is accomplished within the confines of a standard-sized fluid damper 18. Damping performance is consistently maintained even with cylinder 32 being of conventional length and circumference, due to the compact design of assembly 22. The unique configuration of piston valve assembly 22, as will be discussed, thereby permits the generation of semi-active damping forces within the confines of a standard configured shock absorber, readily adaptable to existing frame and suspension components of production vehicles.

Figures 3, 4:
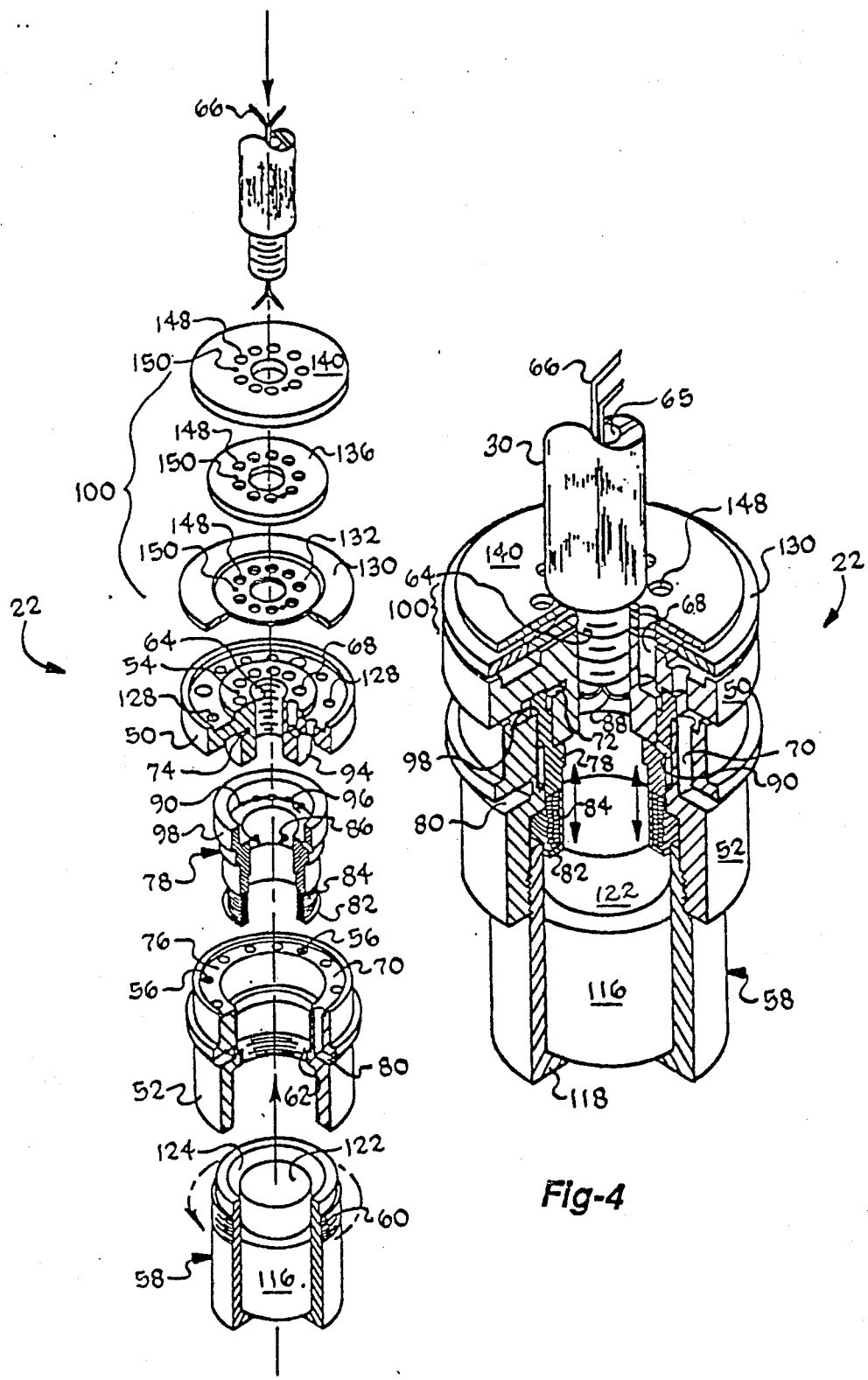
FIG. 3 is an exploded, top perspective view of the piston valve assembly of the present invention.
FIG. 4 is an enlarged, top perspective view of the piston valve assembly partly in section.

As can best be seen in FIGS. 3 and 4, the components of valve assembly 22 are of rugged, durable construction yet in assembly interfit in a compact manner to form the working piston head of damper 18. An upper manifold 50 is secured to a lower manifold 52 by suitable retaining means (not shown) through representative bore holes 54 and 56 (FIG. 3). Upper and lower manifolds 50 and 52 serve to house the remaining elements of piston valve assembly 22 and create the interface between opposing chambers 34 and 36. Magnetic assembly 58, subsequently discussed in greater detail, is engaged by threads 60 to complementary threads 62 of lower manifold 52 to form the lower fluid engaging piston surface of assembly 22. Piston rod 30 threadingly engages upper manifold 50 at bore 64. Piston rod 30 also includes an elongated channel 65 extending longitudinally therethrough which allows signal control wires 66 from external control means to extend internally into piston valve assembly 22. The arrangement described provides for an assembly 22 of maximum load bearing characteristics yet short in overall length.

Direct flow passages 68 and 70 extend respectively through upper manifold 50 and lower manifold 52 to permit fluid communication between opposing chambers 34 and 36. Regulation of fluid flow through direct flow passages 68 and 70 in accordance with the selected signal control commands generates the damping forces. The plurality of radially spaced direct flow passages 68 extend through upper manifold 50 longitudinally about its central axis. The number, diameter and location of the direct flow passages 68 and, for that matter, 70 may be varied along with other dimensions according to the specific damping characteristics required. Direct flow passages 70 are also radially spaced about the longitudinal axis of valve assembly 22 and extend through lower manifold 52. Direct flow passages 70 are spaced at a greater distance radially from the central longitudinal axis of valve means 22 than direct flow passages 68, such that fluid travel from between direct flow passages 68 and 70 must occur through internal porting 72. Porting 72 is formed by the intersection of perpendicular, annular channel 74 (FIG. 3) formed within upper manifold 50 and annular recession 76 machined into a surface of lower manifold 52 directly over direct flow passages 70. In this manner, fluid flow is perpendicular to the axis of valve assembly 22 in the area of internal porting 72 between direct flow passages 68 and 70. As will be discussed in greater detail, restriction of fluid flow in either direction through direct flow passages 68 occurs by controlled interaction of a slider 78 with internal porting 72.

The arrangement of direct flow passages 68 and 70 in parallel, longitudinal orientation through upper and lower manifolds 50 and 52 enable effective transfer of fluid between opposing chambers 34 and 36 without requiring complex routing arrangements. Direct flow passages 68 and 70 may, therefore, be easily machined and oriented in accordance with desired specifications. The radial arrangement of passages 68 and 70 also provides for equalized flow between opposing chambers 34 and 36 over the full cross-sectional area of piston valve assembly 22. Likewise, equalization of pressure and improved flow capability is provided by annular channel 80 of lower manifold 52 having an increased fluid communication surface area. With appreciation for the rapid response times normally required for valve mechanisms of the type provided in the present invention, direct flow passages 68 and 70 remain fully open and unincumbered at their fluid communication surfaces. Secondary valves, piloting mechanisms or other means which may inhibit fluid flow and response time are not required.

Regulation of fluid flow through piston valve assembly 22 is accomplished by externally controlled reciprocal movement of slider 78. Slider 78 includes a moving coil portion 82 through which the force is generated that causes slider displacement. The electrical windings 84 of moving coil 82 are oriented within a magnetic field generated by magnetic assembly 58. Electrical current passing through windings 84 interacts with the magnetic field producing a force to cause the resultant movement of the slider 78. The direction of slider force and hence movement thereof is determined by the direction of electrical current through windings 84. As can be readily seen in FIGS. 4 through 6, windings 84 are connected at solder tab terminal strips 86 to wires 66 and thus permit external control of movement of slider 78 in response to desired command signals. Connection of windings 84 at terminal strips 86 provides an enhanced reliability to the electrical connections. Since windings 84 are composed of comparably rigid wire, a direct connection thereof to wires 66 would soon result in fatigue and breakage during the continuous movement of slider 78. Connection to terminal strips 86 permits flexible wire portions 88 of wires 66 to experience the reciprocal motion while maintaining the electrical connection. The unique configuration of slider 78 and location of terminal strips 86 also allow flexible portions 88 to be of a relatively short length, since wires 66 extend directly through piston rod 30 into the interior of slider 78. The internal orientation of the electrical connections within slider 78 and through bore 64 of upper manifold 50 also serves to protect the electrical connections from the fluid pressure conditions and dynamics of assembly 22.

An advantage of using moving coil 82 to provide the generating force for slider 78 is rapid response time. Typically, electromagnetic valves of the solenoid type experience time lag caused by inductance and force limitations caused by magnetic saturation. On the other hand, a moving coil system or so-called "voice coil" can respond virtually instantaneously as the direction of electric current is changed, to force slider 78 in the desired direction. The moving coil is capable of generating an actuating force consistent with the high fluid pressures normally associated with operating systems. The moving coil is also generally smaller in size than solenoid arrangements and for this reason is better suited for incorporation within piston valve assembly 22. Thus, the improved force and valve time response experienced by slider 78 having a moving coil 82 provide for optimal implementation of command signals typically associated with semi-active devices such as in system 10.

Implementation of desired semi-active control signals may require switching time on the order of 3 milliseconds. Slider 78 must therefore be lightweight and have a short travel length within piston valve assembly 22. In addition, due to the magnetic forces generated by magnetic assembly 58, slider 78 must be constructed of a nonmagnetic material. As will be discussed with relation to the magnetic circuit prescribed by magnetic assembly 58, slider 78 must also operate under tight clearances. This is also desirable to preserve consistent fluid metering characteristics. Slider 78 may be constructed of a material such as titanium, having a low coefficient of thermal expansion relative to the material of upper and lower manifolds 50 and 52. Essentially, the gap between slider 78 and upper and lower manifolds 50 and 52 decreases as thermal expansion occurs. Thus, even at high operating temperatures, the metering ability of slider 78 is maintained as fluid viscosity decreases. It is contemplated that composite or various other materials may be used for construction of slider 78.

Limited clearance of slider 78 may also create a problem of fluid pressure differential caused by rapid oscillation of slider 78 through the viscous fluid. Fluid on either side of slider 78 must somehow be displaced from one side to the other to allow for slider movement. One solution to this problem is through the provision communication venting holes 90 radially spaced about the diameter of slider 78 (FIG. 3). As slider 78 moves back and forth, the fluid is thereby displaced through holes 90. An alternate arrangement for preventing fluid pressure differential may be the employment of by-pass porting (not shown) for fluid clearance within one or both of upper and lower manifolds 50 and 52.

Figure 6:
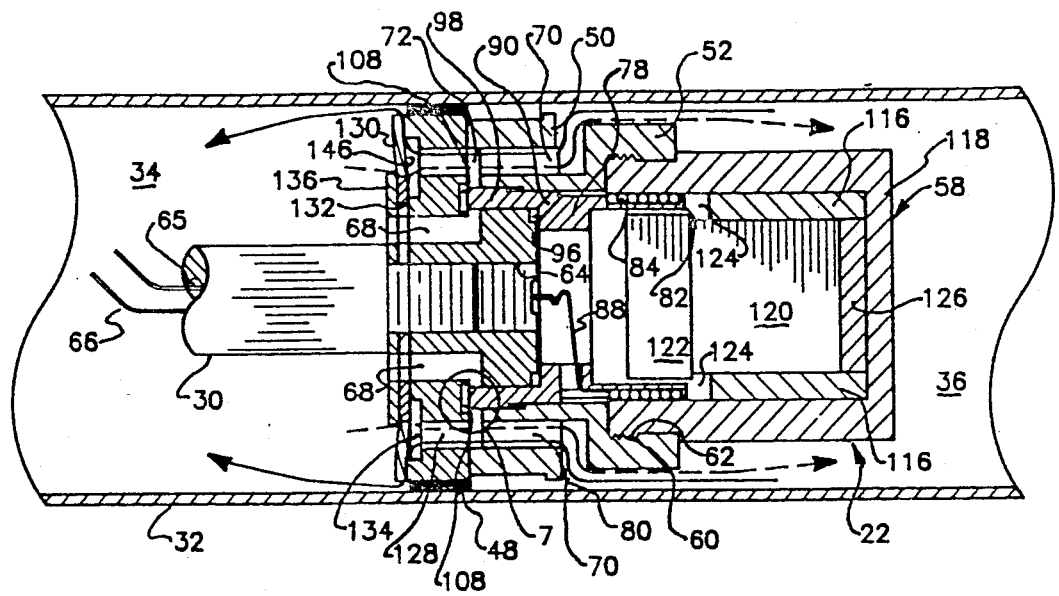
FIG. 6 is a longitudinal, greatly enlarged and broken away elevational view of the fluid damper of FIG. 2 partly in cross-section showing the moving valve slider in the second, closed position preventing flow of fluid between opposing chambers through direct flow passages and permitting flow of fluid through the relief valve assembly.
Figure 5:
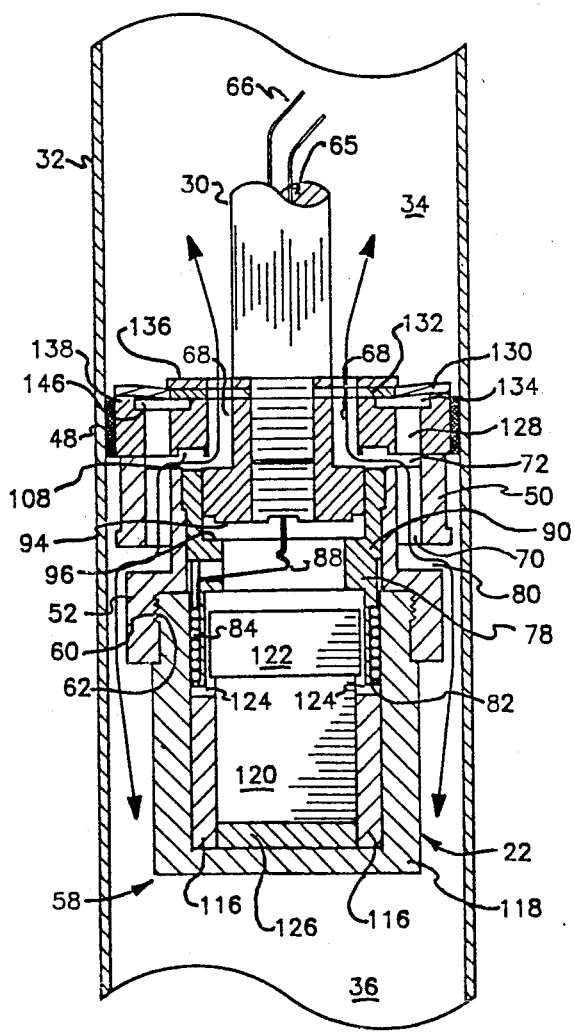
FIG. 5 is an enlarged and broken away elevational view of the fluid damper of FIG. 2 partly in cross-section showing the moving valve slider in the first, open position permitting flow of fluid between opposing chambers through direct flow passages.

As may be seen with reference to FIGS. 5 and 6, the transmissibility characteristics of system 10 are controlled by regulation of fluid flow between opposing chambers 34 and 36 by selective movement of slider 78 between a first position in which flow of fluid through direct flow passages 68 and 70 is substantially permitted (FIG. 5) and a second position in which fluid flow through direct flow passages 68 is substantially restricted (FIG. 6). Slider 78 reciprocates longitudinally about the axis of piston valve assembly 22 very rapidly according to the command signals received thereby through wires 66 from signal control means 20. Force generation by moving coil 82 permits virtually instantaneous displacement with relatively low power requirements and negligible heat buildup. As previously mentioned, the path length of slider 78 between the first position and second position is relatively short. As slider 78 moves in either direction, excess fluid within the system is displaced in part through venting holes 90. The path length of slider 78 and hence the degree to which fluid is restricted in the second position can be adjusted or varied by machining bottom surface 94 of upper manifold 50 which intersects with slider core surface 96 (FIGS. 3 and 5) in the second position. While slider 78 is shown herein to be essentially "free floating" such that its position is subject only to the forces acting thereon, slider 78 may also be biased in either of the first or second positions by a spring (not shown) or other means.

While in the first, open position of slider 78, fluid communication between opposing chambers 34 and 36 is substantially permitted through the direct flow passages 68 and 70. Flow is substantially uninhibited in the area of internal porting 72. The result is that an essentially zero or substantially diminished damping force may be provided at times when slider 78 is in this position. When slider 78 is in the second, closed position, fluid communication between opposing chambers 34 and 36 is interrupted in the area of internal porting 72 by valve element 98 of slider 78. Valve element 98 is operably connected to slider 78 and extends from slider core surface 96. As slider 78 moves into the second position, valve element 98 obstructs internal porting 72 to substantially diminish or prevent fluid flow through direct flow passages 68. As a result, appropriate counteracting damper forces may be generated by assembly 22. The degree to which internal porting 72 is obstructed may be varied according to the particular damping characteristics required by the system, such as by the adjustment of bottom surface 94 previously mentioned. While slider 78 is in the second position, fluid flow is permitted through relief valve means 100, subsequently described, at selected, generally increased fluid pressure differentials.

In order to prevent fluid biasing and jamming of valve assembly 22 under the extreme pressure differential conditions normally associated with such systems, valve element 98 must intersect internal porting 72 in a manner which minimizes undesirable forces impacting on slider 78. As can be seen in FIG. 5, internal porting 72 is oriented such that fluid flow intersects valve element 98 perpendicular to the axis of reciprocative motion of slider 78. Fluid flow through internal porting 72 will impact at right angles to slider movement on either of inner diameter surface 102 or outer diameter surface 104 (FIG. 7) of valve element 98, depending upon the direction of fluid flow. The result is that fluid biasing of slider 78 is substantially minimized, since fluid flow is not directly impinging upon the top surface or terminus 106 of valve element 98 along the axis of slider movement. The annular construction of valve element 98 and radial design of internal porting 72 also prevents jamming of slider 78 by inordinate lateral forces thereon. The system is pressure balanced, in the sense that fluid forces through internal porting 72 will impinge orthogonally to the direction of slider motion on valve element 98 in a radially equalized fashion.

Figure 7:
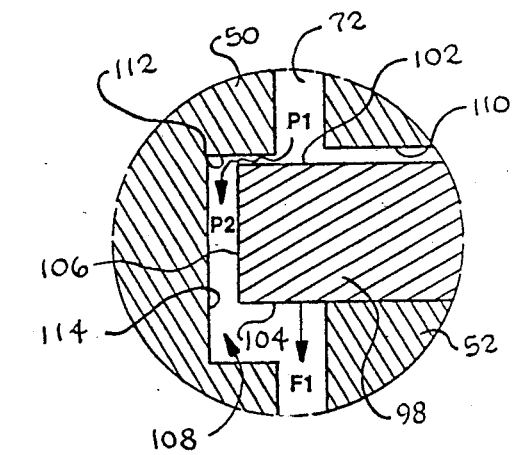
FIG. 7 is an enlargement of the circled area "7" of FIG. 6, representing a fragmentary, radial half-section of the valve element and piston manifold interface across the direct flow passages in the second, closed position, and illustrates the pressure difference ($P_1-P_2$) across the inner diameter of the valve element which causes the slider to experience radially equalized, lateral forces $F_1$.
Figures 8A, 8B:
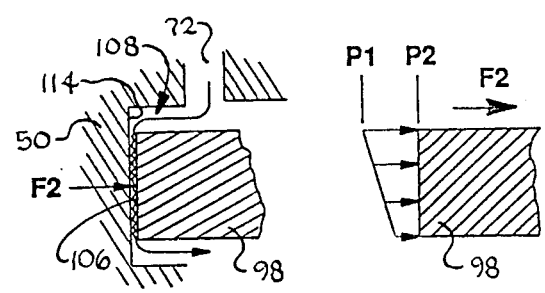
FIG. 8A is an enlarged, fragmentary and radial half-section illustration of a valve element and piston manifold interface similar to that of FIG. 7, but of a type having the fluid flow restricting surface across the terminus of the valve element, and showing the resultant longitudinal forces $F_2$ experienced by the slider.
FIG. 8B is a diagrammatic illustration of the valve element of FIG. 8A showing a pressure gradient across the terminus of the valve element and resultant longitudinal forces $F_2$ experienced by the slider.

The control of fluid biasing which may be experienced under conditions of rapid fluid flow and high pressure differentials is also improved by additional design preferences for minimizing the fluid pressure gradient across the terminus 106 of valve element 98. As depicted in FIG. 7, fluid flow through internal porting 72 impinges directly on the inner diameter surface 102 of valve element 98. In order to permit the flow restricting surface to be along the inner diameter surface 102, elevated valve guide 108 is provided. Elevated valve guide 108 is positioned annularly within upper manifold 50 to receive valve element 98. Slider 78 reciprocates closely along outer wall 110 of upper manifold 50 such that the flow restricting surface of valve element 98 is between inner diameter surface 102 and side wall 112 of elevated valve guide 108. The flow restricting area in the second position, therefore, does not occur along the top surface 106 of valve element 98. As FIG. 7 shows, the pressure difference $P_2 - P_1$ occurs across the flow restricting area between side wall 112 and inner diameter surface 102 without creating a pressure drop across top surface 106, as would be the case in FIG. 8A. The force $F_1$ experienced by valve element 98 is therefore perpendicular to the axis of motion of slider 78. FIGS. 8A and 8B demonstrate an arrangement of valve element 98 across internal porting 72 in the second position in which a fluid biasing force $F_2$ may impinge on slider 78 along the axis of reciprocal movement. Where the flow restricting area occurs between top surface 106 of valve element 98 and an upper wall 114 of elevated valve guide 108, the pressure gradient as shown in FIG. 8B creates force $F_2$ acting on slider 78 in its direction of reciprocal motion. The result is undesirable fluid biasing which can compromise slider performance under normal working conditions for semi-active devices.

The magnetic circuit through which moving coil 82 passes during reciprocal movement of slider 78 is established by magnetic assembly 58. Permanent magnets 116 are radially spaced about the interior wall of magnetic conducting cup 118. Magnetic conducting cup 118 is attached, as previously described, by mating threads 60 and 62 to lower manifold 52. An inner magnetic conducting member 120 is situated within magnetic conducting cup 118 having the permanent magnets 116 situated therebetween. A head portion 122 of the inner magnetic conducting member 120 protrudes into the interior portion of slider 78 about moving coil 82. An annular space 124 is thereby formed between head portion 122 and magnetic conducting cup 118 in which moving coil 82 of slider 78 may reciprocate. The magnetic conducting cup 118 and inner magnetic conducting member 120 direct the magnetic lines of flux of permanent magnetics 116 orthogonally across windings 84. Annular space 124 is relatively small creating close tolerances for slider travel in an effort to maximize the magnetic field strength across windings 84. In order to further maximize the orientation of the magnetic field generated by permanent magnetics 116 orthogonally across magnetic conducting cup 118 and inner magnetic connecting member 120, a lower, bucking magnet 126 may be situated as shown between permanent magnets 116. The magnetic assembly 58 provides a concentrated magnetic field across the coil windings 84 over the full range of reciprocal motion of slider 78. The magnetic field is of sufficient strength to generate the necessary slider forces under all working conditions and yet magnetic assembly 58 is sufficiently compact in construction to provide for a standard piston head. Further, generation of permanent magnetic field in this manner eliminates the need for an electromagnetic power source and associated apparatus.

Fluid metering under conditions of very large pressure differentials is controlled by relief valve means 100 (FIG. 3) of the present invention. Relief valve means 100 is of the floating disc type and permits communication of fluid between opposing fluid chambers 34 and 36 even during times when slider 78 is in the second, fluid restricting position, provided the pressure differential reaches a selected level. Relief valve assembly 100 thereby permits some degree of damping, albeit "stiff", where shock or vibratory conditions of inordinately large magnitudes are experienced that may cause damage to the overall system 10. The conditions under which fluid flow through relief valve means 100 occurs can be adjusted by engineering preload parameters in accordance with desired damping characteristics. The preload parameters may also be adjusted differently during conditions of extension and retraction of valve assembly 22.

Relief valve passages 128 are radially spaced and extend longitudinally through upper manifold 50. Floating disc 130 acts as the valving mechanism for relief valve means 100. A locating ring 132 orients floating disc 130 coaxially with piston valve assembly 22 over the relief valve channel 134 of upper manifold 50. Valve retainer 136 holds floating disc 130 over upper manifold 50 having contact points at manifold lip 138 (FIGS. 3 and 5) and the periphery of valve retainer 136. A valve stop 140 (FIG. 3) may be retained by piston rod 130 over valve retainer 136 to arrest the outer portion 144 of floating disc 130 during retraction of valve assembly 22. During extension of valve assembly 22, the inner portion 146 (FIGS. 3 and 5) of floating disc 130 is arrested by upper manifold 50. Relief valve channel 134 allows for appropriate flexure of the floating disc during actuation of relief valve means 100 in extension to allow fluid flow into relief valve passages 128. Orifices 148 (FIG. 3) are machined respectively in valve stop 142, valve retainer 136 and locating ring 132 for providing fluid communication to direct flow passages 68. Orifices 148 are rotationally aligned and held in place by retaining means 150. While elastic deflection of floating disc 130 in accordance with the desired preload parameters provides adjustable, reliable fluid relief valving for piston valve assembly 22, alternative relief valve arrangements may be contemplated by those skilled in the art.

Figure 9:
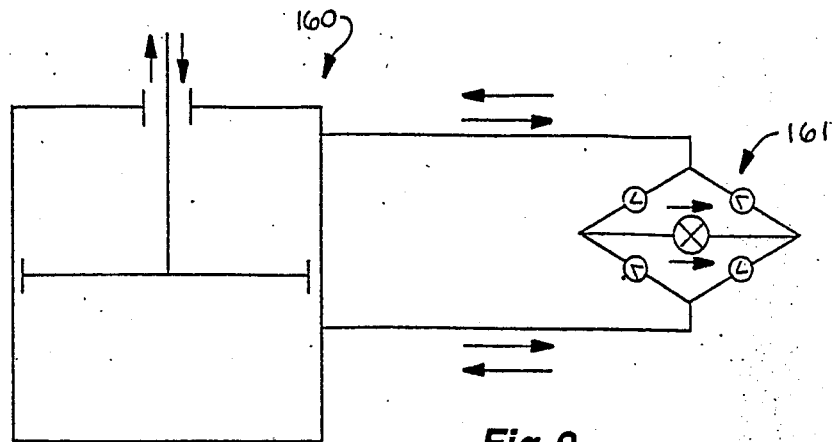
FIG. 9 is a schematic representation of fluid damper assembly illustrating a modified embodiment of the present invention having unidirectional flow of fluid through the valve within the piston during both extension and retraction of the piston.
Figure 10:
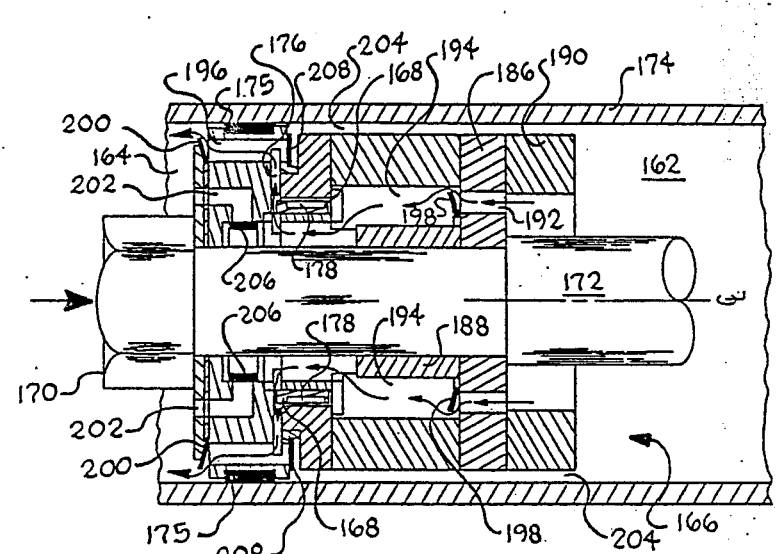
FIG. 10 is a longitudinal, broken away and partly cross-sectional view of an embodiment of a fluid damper assembly according to the present invention having a unidirectional valve arrangement as schematically illustrated in FIG. 9, illustrating flow of fluid through the piston valve assembly during retraction.
Figure 11:
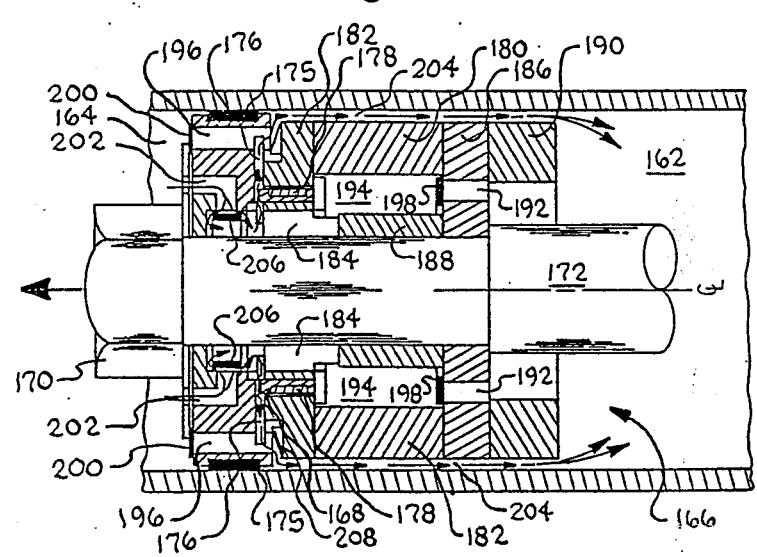
FIG. 11 is a longitudinal, broken away and partly cross-sectional view of an embodiment of a fluid damper assembly according to the present invention having a unidirectional valve arrangement as schematically illustrated in FIG. 9, illustrating flow of fluid through the piston valve assembly during extension.

Though piston valve assembly 22 is quite well suited to semi-active damper applications involving real-time response to command signals for regulation of damper force, alternative slider and flow path arrangements may be incorporated within piston head of a standard fluid damper also having desirable performance characteristics. For example, reduction in the size and weight of the slider serves to remove inherent limitations in displacement response time caused by inertia. Concomitant with slider mass reduction are problems compliance thereof under conditions of extreme fluid pressure familiar to such systems. Alternative flow path arrangements are possible which limit slider deformation solving problems of jamming and failure caused thereby. To satisfy these design alternatives, an exemplary, modified embodiment of the present invention is disclosed as depicted in FIGS. 9 through 11. The system 160 includes a fluid flow path arrangement through the piston valve assembly may be configured to comprise a check valve bridge 161 as schematically illustrated in FIG. 9. Fluid flow between opposing chambers 162 and 164 through piston valve assembly 166 is always in the same direction across valve slider 168.

Referring to FIGS. 10 and 11, piston valve assembly 166 is suitably attached by nut 170 to piston rod 172 for damper movement within cylinder 174. Piston valve assembly is of a compact design to form the piston head of a standard fluid damper. A fluid seal 175 prevents unwanted seepage of fluid between chambers 162 and 164. Valve slider 168 is situated for reciprocal movement within piston valve assembly 166 between a first, open position and a second, fluid restricting position over fluid valve port 176. Valve slider 168 is an annular member formed of lightweight metal or composite material having windings 178 about its outer diameter. The fluid restricting area of valve slider 168 occurs between its inner diameter surface and valve port 176. Externally controlled, reciprocal motion of valve slider 168 is determined by the direction of electrical current through windings 178 situated within a magnetic field. The magnetic flux is generated across windings 178 by magnets 180 properly oriented by inner and outer magnetic conductors 182 and 184 and rear magnetic conductor 186 connected to valve core 188. Rubber bumper 190 may be attached to rear magnetic conductor 186 for protection thereof during extreme movement of piston valve assembly 166 within cylinder 174.

The fluid passage arrangement of piston valve assembly 166 ensures that fluid flow through valve port 176 will always be in the same direction during both extension and retraction; i.e., regardless of the direction of fluid flow between opposing chambers 162 and 164. Fluid flow in a radially outwardly direction from the central axis of valve assembly 166 across the valve slider 168 enables a more precise clearance between valve port 176 and the inner diameter of valve slider 168. The flow forces in this manner will always be perpendicular to the direction of motion of slider 168 and radially equalized. Likewise, the outer direction of fluid flow from the central axis of valve slider 168 will prevent deformation thereof which would tend to decrease its diameter and cause jamming. If, for example, flow were permitted in the opposite direction such that fluid was impinging upon the outer diameter of valve slider 168, the generally lightweight material thereof may be somewhat deformed causing jamming.

The extension of piston valve assembly 166, or the flow of fluid therethrough from chamber 162 to chamber 164, is shown in FIG. 10. Fluid travels through extension inlet ports 192 through fluid passages 194. Fluid flow proceeds across valve port 176 outwardly across valve slider 168 and through extension outlet ports 196. Extension inlet check valves 198 and extension outlet check valves 200 prevent fluid flow therethrough in the opposite direction during retraction, or fluid flow from chamber 164 to chamber 162.

Compression or retraction of piston valve assembly 166 is shown wherein fluid flows therethrough from chamber 164 to chamber 162 as depicted in FIG. 11. Fluid enters compression inlet ports 202 and travels through valve port 176 outwardly across valve slider 168 and proceeds through compression outlet ports 204 into opposing chamber 162. Compression inlet check valves 206 and compression outlet check valves 208 prevent fluid flow therethrough in the opposite, extension direction.

As may be readily apparent, a check valve bridge such as 161 provides for unidirectional fluid flow across the valve element of a remotely controlled piston valve assembly. A unidirectional flow design is especially advantageous where a reduced mass, lightweight slider is employed. The flow of fluid radially outwardly across the valve slider prevents binding thereof which may otherwise be unavoidable due to the compliant nature thereof. Unidirectional flow configurations thus also enhancement of valve slider performance and reliability.

It can be seen from the foregoing that the present invention provides a piston valve assembly which is of a reliable, performance-oriented and relatively inexpensive construction and is readily adaptable to a wide variety of variable damper applications. Due to the unique cooperation of the valving elements even under extreme fluid pressure conditions experienced within the piston of a fluid damper, real-time response to external command signals is possible actuated internally within the piston to regulate fluid flow therethrough and generate required damping forces. The rapid valve response and reliable performance thereof make the system especially adaptable to semi-active damper control applications. The use of a moving coil valve slider provides very rapid, substantially instantaneous regulation of damper force with relatively low voltage requirements. The arrangement of fluid flow across the valve element in a direction perpendicular to the axis of motion of the slider in the manner described prevents fluid biasing even under adverse pressure conditions. Particularly in its unidirectional flow version, the piston valve assembly greatly minimizes the adverse effects of fluid pressure on valve performance.

While preferred embodiment of the present invention has been described in detail, various modifications, alterations and changes may be made without departing from the spirit and scope of the present invention as defined in the appended claims.

What is claimed is:

1. A damping system for attenuation of motion between spaced members providing a controllable damper force operative independently of the motion condition of the damper, having a cylinder containing a damping fluid, and a piston slideably disposed within the cylinder in response to relative motion between the spaced members and dividing the cylinder into opposing fluid chambers, the improvement comprising:
   flow passages through said piston having openings thereof in communication with each of said opposing chambers and having orthogonal portions thereof interiorly positioned within said piston for permitting regulated flow of fluid therethrough between said opposing chambers;
   a slider within said piston having a moving coil portion and a valve element portion operably interconnected and axially reciprocative relative to a permanent magnetic field within said piston between a first position and a second position dependent upon the direction of electric current passing through said moving coil;
   wherein in said first position flow of fluid between said opposing chambers is substantially unrestricted through said flow passages and in said second position said valve element intersects said orthogonal portions of said flow passages to substantially restrict flow of fluid therethrough, said slider being axially reciprocative between said first and second positions independently of the fluid pressure differential between said opposing chambers;
   said flow passages including unidirectional flow means for flow of fluid radially outwardly from the central axis of said piston through said orthogonal portions and across said valve element during flow in both compression and extension of said piston.

2. The damping system according to claim 1 wherein said unidirectional flow means comprises:
   extension passages for permitting flow of fluid therethrough to said orthogonal portions during extension of said piston;
   extension passage check valves for preventing flow of fluid through said extension passages during compression of said piston;
   compression passages for permitting flow of fluid therethrough to said orthogonal portions during compression of said piston;
   compression passage check valves for preventing flow of fluid through said compression passage during extension of said piston.

3. A damper assembly for providing a controllable damper force between spaced members operative independently of the motion condition of the damper, having a cylinder containing a damping fluid, and a movable piston slideably disposed within the cylinder in response to relative motion between said spaced members and dividing the cylinder into opposing first and second chambers, comprising;
   control valve means located within said movable piston responsive to a command signal for regulating flow of fluid between said opposing chambers operative independently of the fluid pressure differential between said opposing first and second chambers;
   said control valve means including a valve slider having a coil member thereof oriented in a permanent magnetic field, wherein said valve slider is rapidly movable within said piston in response to the direction of electric current through said coil member between a first position in which flow of fluid between said chambers is permitted and a second position in which flow of fluid is substantially restricted;
   a valve element portion of said valve slider having an annular top surface and inner and outer diameter surfaces;
   radially spaced direct flow passages through said piston interconnecting said opposing chambers for flow of fluid therebetween, said direct flow passages including an annular valve receiving channel such that in said first position, fluid flows over said annular top surface of said valve element and through said annular valve receiving channel, and in said second position, said valve element obstructs said annular valve receiving channel to substantially restrict flow of fluid between said opposing chambers;
   said annular valve receiving channel including an elevated valve guide means within said piston for receiving said annular top surface of said valve element, wherein restriction of fluid flow occurs along one of said inner and outer diameter surfaces, thereby substantially minimizing biasing of said valve element along its direction of reciprocative motion.

4. The apparatus according to claim 3, further comprising:
   permanent magnet means for providing said magnetic field having permanent magnets radially interspaced between inner and outer magnetic conductors within said piston.

5. The apparatus according to claim 4 wherein:
   a lower magnetic insulator is positioned orthogonally between said inner and outer magnetic conductors for enhancing said magnetic field across said coil member.

* * * * *

UNITED STATES PATENT AND TRADEMARK OFFICE
CERTIFICATE OF CORRECTION

PATENT NO. : 4,907,680
DATED : March 13, 1990
INVENTOR(S) : Wolfe et al.

It is certified that error appears in the above-identified patent and that said Letters Patent is hereby corrected as shown below:

IN THE ABSTRACT

In line 2, change "control led" to --of motion between spaced members is provided having a remotely controlled--.

In line 3 and 4 delete "of motion between spaced members is provided having a remotely".

IN THE SPECIFICATION

Col. 13, line 29, change "piston head" to --the piston head--.

Signed and Sealed this

Sixteenth Day of April, 1991

Attest:

HARRY F. MANBECK, JR.

Attesting Officer     Commissioner of Patents and Trademarks